(12) United States Patent
Lowe

(10) Patent No.: US 8,557,379 B1
(45) Date of Patent: *Oct. 15, 2013

(54) MULTILAYER GRAPHIC ARTICLE

(76) Inventor: Clifford A. Lowe, Rocky Mount, NC (US)

(*) Notice: Subject to any disclaimer, the term of this patent is extended or adjusted under 35 U.S.C. 154(b) by 1563 days.

This patent is subject to a terminal disclaimer.

(21) Appl. No.: 11/977,108

(22) Filed: Oct. 22, 2007

Related U.S. Application Data

(63) Continuation of application No. 10/688,583, filed on Oct. 17, 2003, now Pat. No. 7,361,403.

(60) Provisional application No. 60/419,692, filed on Oct. 18, 2002.

(51) Int. Cl.
| | |
|---|---|
| B32B 3/00 | (2006.01) |
| B32B 5/02 | (2006.01) |
| B32B 7/12 | (2006.01) |
| B32B 9/00 | (2006.01) |
| B32B 27/00 | (2006.01) |

(52) U.S. Cl.
USPC .......................... 428/354; 428/353

(58) Field of Classification Search
USPC .................. 428/40, 354, 353; 442/49, 50
See application file for complete search history.

(56) References Cited

U.S. PATENT DOCUMENTS

| | | | |
|---|---|---|---|
| 4,824,717 A * | 4/1989 | Nakanishi et al. | ............... 442/49 |
| 5,468,532 A | 11/1995 | Ho et al. | |
| 6,180,228 B1 | 1/2001 | Mueller et al. | |
| 6,228,486 B1 | 5/2001 | Kittel et al. | |
| 6,756,095 B2 | 6/2004 | Sandt et al. | |
| 7,361,403 B1 | 4/2008 | Lowe | |

* cited by examiner

*Primary Examiner* — Matthew Matzek
(74) *Attorney, Agent, or Firm* — Zollinger & Burleson Ltd.

(57) ABSTRACT

A multilayer graphic article includes (a) a fabric matrix or support having an upper and lower surface, (b) at least one image layer disposed on the upper surface of the fabric matrix or support, (c) a protective layer disposed over the at least one image layer, and, (d) an adhesive layer adhered to the lower surface of the fabric matrix or support.

8 Claims, 1 Drawing Sheet

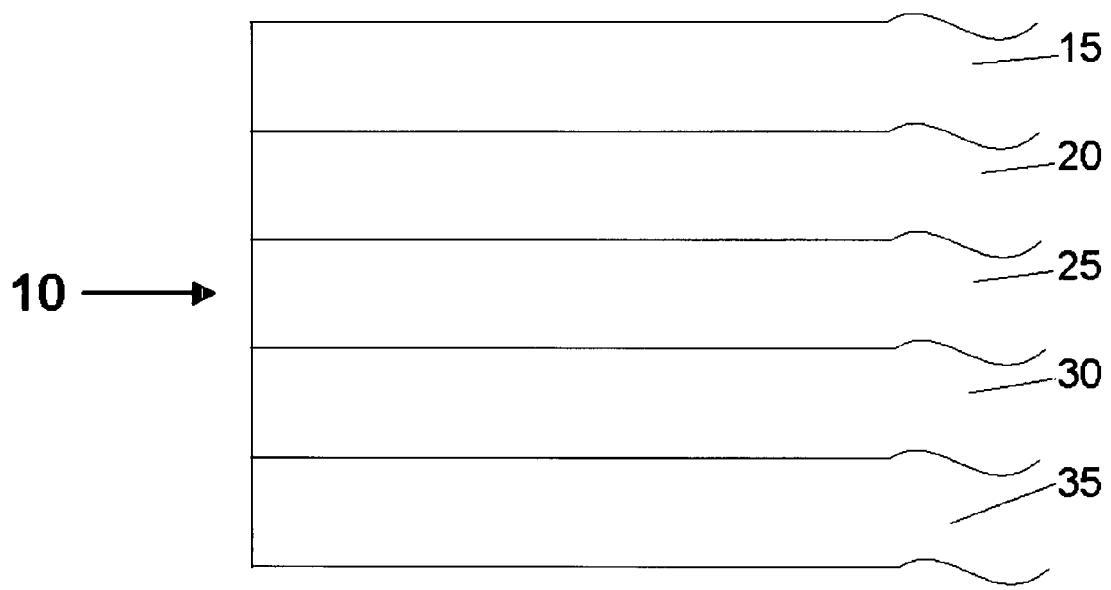

MULTILAYER GRAPHIC ARTICLE

CROSS-REFERENCE TO RELATED APPLICATIONS

This application is a continuation of U.S. patent application Ser. No. 10/688,583, filed Oct. 17, 2003 now U.S. Pat. No. 7,361,403, which claims the benefit of U.S. provisional patent application No. 60/419,692, filed Oct. 18, 2002. The entire disclosure of the former is incorporated herein by reference.

BACKGROUND OF THE INVENTION

Multilayer graphic systems (or articles) are known. For example, U.S. Pat. No. 5,468,532 teaches a system whereby first and second color layers (i.e., a graphic print) are deposited on a polymeric substrate. A clear protective layer is deposited over the color layers to protect the color layers, and an adhesive layer is disposed below the substrate so that the substrate can be applied to the various surfaces. In a similar fashion, U.S. Pat. No. 6,180,228 teaches a multilayer graphic system that is particularly suited for outdoor use. This graphic system includes a polymeric base layer, an adhesive layer disposed below the base layer, and an image layer disposed above the base layer. The protective polymeric film is laminated to the image layer by using an adhesive laminate.

These multilayered graphic systems can be applied to a number of substrates and can be used in both indoor and outdoor environments. In one common use, multilayer graphic systems are employed as communication or advertising media. In other words, the systems are adhered to horizontal or vertical services for the purpose of communicating a message or advertisement. For example, the graphic system can be adhered to the floor of a consumer store to provide point-of-purchase advertising. In another example, the graphic system can be adhered to a factory floor to direct traffic patterns or alert passersby of a particular danger.

Where the layered graphic system is applied to horizontal surfaces, the graphic systems are subjected to many forces, such as pedestrian or automotive traffic, that can stretch or tear the system. These problems are exacerbated by thicker graphic systems because the height of the system subjects the system to greater forces. The problem is not easily solved, however, by decreasing the thickness of the substrate. Thinner graphic systems, which have been prepared by decreasing the thickness of the polymeric substrate, result in a graphic system having less integrity. This not only creates problems during usage but also during removal. Inasmuch as graphic systems are typically temporary (e.g., advertising systems), there is a need to readily remove the graphic system from the substrate and, potentially, apply a new graphic system. Where the graphic system tears during removal, replacement is often difficult and inefficient.

There is, therefore, a need for improved graphic systems.

SUMMARY OF THE INVENTION

In general the present invention provides a multilayer graphic article comprising (a) a fabric matrix or support having an upper and lower surface, (b) at least one image layer disposed on the upper surface of said fabric matrix or support, (c) a protective layer disposed over the at least one image layer, and (d) an adhesive layer adhered to the lower surface of the fabric matrix or support.

The present invention also includes a multilayer graphic article comprising (a) a fabric matrix having upper and lower surfaces, (b) a first primer layer disposed on the upper surface of said fabric matrix, (c) a graphic layer disposed on the primer layer, (d) a protective layer disposed over the image layer, (e) a second primer layer disposed on the lower surface of said fabric matrix, and (f) an adhesive layer adhered to the second primer layer.

The present invention further a method for preparing a multilayer graphic article, said method comprising applying a protective coating to a matrix carrying an image layer, said applying step consisting essentially of applying a liquid polymer to said matrix or image layer.

By employing a fabric substrate, the present invention overcomes many of the problems associated with prior art multilayer graphic systems. The multilayer graphic system can be made very thin because the fabric substrate employed can be very thin. Although thin, fabric substrates provide equal if not greater strength than polymeric substrates employed in the prior art. As a result, the graphic articles of this invention can be shipped and applied or installed without deleteriously impacting the article. Moreover, the articles can be efficiently removed without tearing. In those embodiments that employ graphic printing to provide the graphic system with a visible image, the fabric has proven to provide a substrate that can be efficiently printed on and yield a platform upon which high quality printing can be disposed.

BRIEF DESCRIPTION OF THE DRAWINGS

FIG. 1 is an enlarged cross-sectional view of one embodiment of a multilayer graphic article according to the present invention.

DETAILED DESCRIPTION OF ILLUSTRATIVE EMBODIMENTS

A preferred multilayer graphic article of the present invention is best described with reference to FIG. 1. Graphic article 10 includes fabric matrix or support 25 with image layer 20 disposed thereon. Protective coating 15, which may carry optional anti-skid particles, is disposed on image layer 20 to prevent damage to the image layer 20 from a variety of conditions to which the graphic article 10 may be subjected. Below and adhered to fabric matrix or support 25 is adhesive layer 30, which may carry optional release liner 35.

The matrices or supports in the practice of this invention are fabrics. Fabrics include those textile structures comprising mechanically interlocked fibers or filaments. These fibers or filaments can be woven or non-woven. In other words, woven fabrics include closely oriented warp and filler strands. In a preferred woven fabric, the warp and filler strands are at right angles to one another. The non-woven fabric includes those fibers or filaments that are randomly integrated. Many procedures are known in the art for mechanically interlocking non-woven fibers or filaments. One method commonly employed in the art is needle punching.

Any fiber or filament employed in the textile arts can be employed to make the fabrics employed in the present invention. These fibers or filaments include natural, synthetic, and semi-synthetic materials. Natural fibers include those obtained from animals including wool and silk, those obtained from vegetables including cotton, and those obtained from mineral sources such as asbestos. Synthetic fibers include high polymers such as polyamides (e.g., Nylon 6, and Nylon 6,6), polyesters, polyaramids (e.g., Kevlar™), acrylics, and polyolefins.

Semi-synthetic fibers include rayon and inorganic substances extruded in fibrous form, such as glass, boron, boron carbide, boron nitride, carbon, graphite, aluminum silicate, fused silica, and some metals.

Useful fibers and filaments are generally characterized by a denier of about 40 to about 2000, preferably from about 60 to about 400, and more preferably from about 100 to about 250.

The fiber or filament dimensions can also be provided by (dpf) values, which are commonly known in the art. Accordingly, useful fibers and filaments can be characterized by a dpf of 0.8 to about 2.4, preferably from about 1.0 to about 2.2, and more preferably form about 1.2 to about 2.

The fibers and filaments prepared within the fabrics employed in the present invention can be treated. The treating of fibers is well known in the textile arts. For example, it is common to treat nylon filaments with resorcinol-formaldehyde liquid (i.e., RFL coatings) or with various softening and sizing agents including butadiene acrylonitrile polymer latexes.

The matrix or support layer (i.e., the fabric) preferably has a thickness from about 0.005 to about 0.05 cm, more preferably from about 0.01 to about 0.03 cm, and even more preferably from about 0.015 to about 0.025 cm.

Numerous useful fabrics are available from a number of suppliers within the textile industry. Useful fabrics can be purchased from, e.g., Johnston Industries, Inc. (Valley, Ala.).

Depending on the fabric employed, it may be advantageous to prime the fabric prior to printing thereon or disposing the graphic layer thereon. It may also be advantageous to prime the fabric prior to adhering the adhesive layer thereto. In some embodiments, it may be advantageous to employ a different primer on each side of the fabric, or combination of primers. As known by those skilled in the art, there are a multitude of primer compositions that can be employed to prime fabrics. Preferred primers include those that provide a barrier that will prevent the adhesive or the materials employed in creating the graphic or adhesive from penetrating through the fabric in a deleterious manner. Preferred primers may also serve to activate the surface of the fibers so as to facilitate and improve the printing or placement of a graphic on the fabric or allow the adhesive to form a stronger bond with the fabric.

Useful primers include vinyl-based latexes, acrylic latexes, polyester latexes, and carboxylated butadiene acrylonitrile latexes. Polyurethane primers can also be used. A commercially available primer that has been found to be particularly useful is a self-crosslinking acrylic latex (medium hardness) that is compounded with $TiO_2$, white clay, and thickeners. This primer is very similar to white paint.

The adhesive layer should have the ability to adhere to a variety of surfaces including both vertical and horizontal surfaces as well as indoor and outdoor surfaces. While the adhesive layer preferably provides sufficient adhesion and peel strength so that ordinary conditions and forces that will impact the graphic article will not displace the article from the substrate to which its attached, the adhesive should be removable such that it can be removed from various substrate surfaces without leaving substantial residue. The adhesive can also be selected based upon the desired use so that certain performance characteristic can be achieved. For example, for use on a typical concrete surface, the adhesives selected should have a 180° pullback adhesion to concrete block of about 250 to about 1250 g/in, and should be applicable to an outdoor matrix or support within a temperature range of about 10° to about 30° C.

A variety of adhesives such as, but not limited to, pressure sensitive adhesives and laminating adhesives can be used. Exemplary adhesives are disclosed in U.S. Pat. No. 3,451,537, which is incorporated herein by reference. Useful adhesives include those based on acrylics, natural rubbers, styrene-isoprene-styrene block copolymers, silicone based adhesives such as polydimethylsiloxane and polymethylphenylsiloxane, butyl rubber based adhesives, and polyurethane based adhesives. The adhesive may also be crosslinked.

The adhesive layer may also include additives such as those typically employed in adhesives. Useful adhesives include fibers, ground glass, titanium dioxide, silica, glass beads, waxes, tackifiers, low molecular weight thermoplastics, oligomeric species, plasticizers, metallic flakes, metallic powders. These additives are preferably employed in an amount that does not materially affect the ability of the adhesive to bond to the matrix or support as well as the substrate.

Acrylic adhesives include crosslinked acrylics such as those commercially available as Scotch™ Laminating Adhesive 468 MP and Stamark™ Laminating Adhesive 9505 (both from 3M Co.; St. Paul, Minn.), as well as tackified acrylics such as those available commercially as Scotch™ Laminating Adhesives 9472 and 9774 (3M). Other commercially available options include MAC Film™ IF-2095, IF-2015, and IB-1101 adhesives (MACTAC Corp.; Stow, Ohio).

The adhesive layer preferably has a thickness of about 2 mils (0.005 cm) to about 10 mils (0.025 cm), more preferably a thickness of about 5 mils (0.013 cm), and even more preferably from about 5 mils to about 7 mils.

If desired, the bottom surface (i.e., the surface that contacts the substrate) of the adhesive layer can be treated to permit repositioning of the graphic article before a permanent bond is formed with the matrix or support. This is preferably used when using a removable primer.

The bottom surface of the adhesive layer may optionally carry a release liner to facilitate handling and shipping prior to application to the substrate. As is generally known in the art, these release liners may include silicone impregnated paper.

The protective coating preferably provides protection to the graphic layer from the number of conditions that the graphic article may be subjected to. These conditions include pedestrian traffic, automotive traffic, environmental sources such as sunlight and water, and a variety of other conditions. The type of protective coating employed can be selected based upon the conditions to which the graphic article may be subjected. In any event, it is especially preferred that the protective coating be clear or transparent and thereby not deleteriously impact the ability to view the graphic layer. The ability to view the graphic layer, of course, will depend on the content of the graphic layer. For example, where the graphic layer is a solid color, the clarity or transparency of the protected layer is not as critical as when the graphic layer includes detailed text or graphics.

Materials that can be employed as the protective layer include polyurethane-based, and epoxy-based materials. Also, non-polyurethane-based protective layers may also be used, especially for indoor applications.

Polyurethane-based surface layers comprise the reaction product of a polyisocyanate and an active hydrogen containing material. Aliphatic and aromatic polyisocyanates may be used. The former are preferred for exterior applications; the latter are preferred for interior uses as discussed below. Suitable aliphatic diisocyanates may be selected from isophorone diisocyanate, 1,6-hexamethylene diisocyanate, bis-(4-isocyanato cyclohexyl)methane, and 1,4-cyclohexyl diisocyanate.

Useful active hydrogen containing compounds include polyester polyols, polycarbonate polyols and polyacrylic polyols, as well as blends of any of these materials for exterior applications and, for interior uses, polyether polyols.

Reactive systems for providing polyurethane-based surface layers may include short chain diols (e.g., 1,4-butane diol) and short chain diamines (e.g., ethylene diamine) for modifying polymer properties. It will be understood that the concept of a polyurethane reaction product encompasses the presence of such materials.

Two-part, solvent-based polyurethanes provide useful surface layers as commonly employed in the industry.

Aqueous-based polyurethane dispersions are preferred because they are more environmentally compatible than their solvent-based counterparts. Aqueous-based polyurethane dispersions may contain minor amounts of organic co-solvents.

Polyurethane-based surface layers having utility in the invention include polyurethane/acrylic resin dispersion blends and polyurethane/aqueous epoxy blends. In these blends, the polyurethane component predominates and provides a continuous phase in which are dispersed islands or micro-domains of the acrylic or epoxy component. The acrylic or epoxy component typically provides no more than about 25 to 30% of the blended surface layer.

Useful materials that can be used as the protective coating or to form the protective coating layer are available form a number of commercial sources. For example, polyurea clear coats are available under the name Aliphatic ClearCoat™ (VersaFlex, Inc.; Kansas City, Kans.). Epoxy coatings are available under the tradename Non-Slip Epoxy Coating 5001-A (Trusty Step, Inc.; Lynn, Mass.) 2-component non-slip polyurethane coatings are available under the tradename Syntaflex™ NS (Adamin Industries; Quebec, Canada). Others include Rust-O-thane™ and Crystal Clear™ (Rust-Oleum Corp.; Illinois). The Surlyn™ family of ionomer resins are suitable commercial materials.

The thickness of the protective layer is preferably from about 2 to about 15 mils, more preferably from about 5 to about 10 mils, and even more preferably from about 7 to about 8 mils.

In certain embodiments, the surface of the protective layer (i.e., the top surface or that surface that would be contacted by pedestrian traffic) may be structurally modified. In one particular embodiment, the surface may be embossed or otherwise textured. Techniques for embossing or texturing the surface of polymeric materials such as the protective coating are known in the art.

The protective layer may also be modified by incorporating into or onto the protective layer a variety of fillers or particles. For example, antiskid particles can be applied to the top surface of the protective coating to roughen the surface thereof and prevent slippage. Alternatively, these particles may be added to only a portion of the surface of the protective layer and thereby render only a portion of the protective layer within the antiskid properties. This may be preferred in situations where the clarity and visibility of the graphic layer is desirably not compromised. In yet another embodiment, antiskid or reflective particles may be added to the composition that forms the protective layer (e.g., the polyurethane components) and are thereby incorporated into the layer itself.

Reflective particles and antiskid particles are available from a number of commercial sources. For example, useful particles can be obtained from the company Flex-O-Lite.

The image layer can be comprised of one or more color layers, any of which can be applied continuously or discontinuously to form an informational or decorative design. The specific number of color layers used for a particular application can be dictated by the desired visual impact of the graphic article, printing costs, and the like. However, several color layers are particularly preferred to provide an image layer with significant advertising impact. These multi-color image layers are typically digitally created and applied in one pass through a large format printer to provide an image with photograph-like realism. The color layers making up the image layer can be applied by any known printing or painting method for forming an image on a polymeric film, including, for example, screen printing, electrographic (electrostatic and electrophotographic) printing, offset printing, thermal ink jet printing or thermal mass transfer. A preferred printing process employs a UV ink jet printer from Zünd (Switzerland).

The color layers useful in the present invention can be provided as an aqueous solution, emulsion or dispersion comprising a binder, a color agent and various optional ingredients. As described in, for example, U.S. Pat. No. 5,468,532, which is incorporated herein by reference, suitable color layer compositions can be engineered to provide specific benefits to the image layer. For example, the binder(s) selected for use in the color layers can display hot melt adhesive properties and can be blended to improve the tensile strength, heat resistance, and environmental resistance of the color layer, as well as its adhesion to the base layer or image-protective surface layers. The binder used in the color layers can be crosslinked to alter the modulus, the dimensional stability in response to temperature and humidity, melting temperature, tensile strength, adhesion or heat resistance of the image layer. Other optional additives which can be incorporated into the color layer include co-solvents, defoamers, surfactants, antioxidants, light stabilizers, ultraviolet light absorbers, biocides and the like.

The multilayer graphic articles of this invention can be manufactured by a variety of techniques and, the various manufacturing steps can be varied. Similar procedures are described in U.S. Pat. Nos. 5,468,532 and 6,180,228, which are incorporated herein by reference.

The fabric matrix or support can be obtained from a number of commercial sources as noted above. Typically, the manufacture of these fabrics sill treat the fibers prior to mechanically interlocking the fibers, although post treatments are likewise known. When the matrix or support is primed, it is preferred to first prime the matrix or support prior to application of the adhesive or graphic layer. A primer can preferably be applied to the matrix or support by spraying, brush coating, dip coating, or similar techniques known in the art. The primer can be applied to one or both sides of the matrix or support, and a different primer can be applied to each side of the matrix or support. Depending on the primer employed and the viscosity thereof, the application of primer to one side of the matrix or support may be sufficient where a useful amount of primer penetrates through the fabric to provide a beneficial amount of primer to the other side of the fabric.

Once the fabric matrix or support is preferably primed, the image layer can be applied to the matrix or support followed by application of the adhesive, or, preferably, the adhesive can be applied to the matrix or support prior to application of the graphic layer. In either event, the adhesive layer can be applied to the matrix or support (or primer) by using a variety of techniques. Where the adhesive is in the form of a tape, the adhesive can be applied or laminated to the matrix or support to form a laminate. In another embodiment, the adhesive may be melt extruded onto the laminate or applied as a liquid. As those skilled in the art will appreciate, liquid adhesives can be spray coated, roller coated, or knife blade coated onto the matrix or support. Where a release liner is employed, the release liner can be applied to the adhesive before the adhesive is adhered to the matrix or support. This is especially useful when a tape structure is laminated to the matrix or support. Alternatively, and as would by typically preferred in the case where a liquid adhesive or a melt extruded adhesive is applied to the matrix or support, the release liner is preferably adhered after application of the adhesive to the matrix or support.

Also, adhesion between adjacent layers of the article may be promoted through various oxygenating treatments such as corona discharge and plasma exposure. In such instances, the further inclusion of tie layers may be unnecessary.

In another embodiment of the present invention, the matrix includes a polymeric material that may be fiber or filament reinforced. In this embodiment, it is advantageous to apply the protective coating as a liquid directly to the image layer, which obviates the need for a separate adhesive, which is required when the protective layer is laminated to the image layer.

Materials suitable for the polymeric film base layer include butadiene acrylonitrile PVC (e.g., PARA-CREIL OZO™ from Uniroyal or Krynac™ from Bayer) resins; alpha-olefins such as polyethylene, polypropylene, and blends and copolymers thereof; ethylene-modified copolymers such as ethylene vinyl acetate, ethylene acrylic acid, ethylene methacrylic acid, ethylene methacrylate and blends and mixed polymers of these materials such as ethylene methylacrylate acrylic acid terpolymers; polyurethanes; PVC and rubbery polymers such as ethylene propylene diene monomer ter-polymer (especially white EPDM); rubber modified polyolefins and styrene butadiene rubbers and hydrogenated rubbers based on butadiene and/or acrylonitrile. Useful materials are also available from the Patch Rubber Company.

For example, a thin metal or foil layer, a woven or non-woven scrim layer, or a layer of fibrous material can be applied to a surface of the base layer with a suitable adhesive, or can be incorporated between two layers if polymeric film to form a reinforced base sheet-like construction. In addition, to enhance adhesion between adjacent layers, the graphic article of the present invention can include one or more tie layers between otherwise adjacent layers of the construction.

Typically, the base layer will be about 1 mil (0.003 cm) to about 10 mils (0.03 cm) thick, with a thickness of about 4 mils (0.01 cm) preferred for most applications expected to be subjected to pedestrian traffic.

In this embodiment, it has been found to be particularly advantageous to apply the protective coating to the article (i.e., over the image layer) while the protective coating material is in a liquid form. The liquid protective material advantageously can be applied by spray coating, roller coating, knife-blade coating, all of which are known in the art.

Various modifications and alterations that do not depart from the scope and spirit of this invention will become apparent to those skilled in the art. This invention is not to be duly limited to the illustrative embodiments set forth herein.

That which is claimed is:

1. A graphic article adapted for application and adherence to a horizontal surface subjected to automotive traffic, comprising:
   a) a fabric comprising upper and lower surfaces, said fabric having a thickness of from about 0.01 to about 0.03 cm, said upper surface bearing a printed image and said lower surface being adapted to directly contact an adhesive, and
   b) a transparent outer protective layer disposed above said image, said outer protective layer having a thickness of from about 2 to about 15 mils.

2. The graphic article of claim 1 further comprising a primer on said fabric, said primer composition being derived from a latex composition applied to said lower surface of said fabric.

3. The graphic article of claim 1 further comprising an adhesive adapted for contact with a horizontal surface.

4. The graphic article of claim 3 wherein said adhesive has a thickness of from about 0.005 to about 0.025 cm.

5. The graphic article of claim 4 wherein said adhesive has a thickness of from about 0.013 to about 0.018 cm.

6. The graphic article of claim 1 wherein said outer protective layer comprises a polyurethane.

7. The article of claim 6 wherein said polyurethane is provided from an aqueous dispersion.

8. The article of claim 6 wherein said outer protective layer further comprises an acrylic or epoxy component.

* * * * *